United States Patent
Sargent (10) Patent No.: US 6,490,939 B1
(45) Date of Patent: Dec. 10, 2002

(54) POSITION SENSOR AND HOUSING THEREFOR

(75) Inventor: Leigh R. Sargent, Indianapolis, IN (US)

(73) Assignee: Applied Composites, Inc., Indianapolis, IN (US)

( * ) Notice: Subject to any disclaimer, the term of this patent is extended or adjusted under 35 U.S.C. 154(b) by 0 days.

(21) Appl. No.: 09/373,346

(22) Filed: Aug. 12, 1999

Related U.S. Application Data (60) Provisional application No. 60/096,323, filed on Aug. 12, 1998.

(51) Int. Cl.$^7$ .............................................. G01L 19/00
(52) U.S. Cl. .................................................... 73/866.5
(58) Field of Search ........................................ 73/866.5

(56) References Cited

U.S. PATENT DOCUMENTS

| | | | | |
|---|---|---|---|---|
| 2,780,094 A | * | 2/1957 | Fink ...................... | 73/866.5 X |
| 3,701,965 A | * | 10/1972 | DuRocher et al. ............ | 439/86 |
| 4,238,728 A | * | 12/1980 | Wells, Jr. et al. ...... | 324/72.5 X |
| 4,852,451 A | * | 8/1989 | Rogers .................. | 73/866.5 X |
| 5,186,050 A | * | 2/1993 | Lagace et al. .......... | 73/866.5 X |
| 5,325,734 A | * | 7/1994 | Jordan ....................... | 73/866.5 |
| 5,379,658 A | * | 1/1995 | Lichtenfels, II et al. ... | 73/866.5 |
| 5,537,734 A | * | 7/1996 | Belka et al. ................... | 29/705 |
| 5,661,251 A | * | 8/1997 | Cummings et al. ........ | 73/866.5 |
| 5,945,606 A | * | 8/1999 | Tokunaga et al. .............. | 73/756 |
| 6,000,290 A | * | 12/1999 | Benton et al. ............. | 73/866.5 |
| 6,019,007 A | * | 1/2000 | Grieger et al. ............. | 73/866.5 |
| 6,133,729 A | * | 10/2000 | Mierzwinski ............... | 324/174 |

FOREIGN PATENT DOCUMENTS

| | | | | |
|---|---|---|---|---|
| CH | 680089 A5 | * | 6/1992 | ................ 73/866.5 |
| DE | 266847 A1 | * | 4/1989 | ................ 73/866.5 |
| DE | 3923544 C1 | * | 10/1990 | ................ 73/866.5 |
| EP | 771609 A1 | * | 5/1997 | ........... B23Q/11/10 |
| FR | 2678063 | * | 12/1992 | ................ 73/866.5 |
| JP | 3-105212 | * | 5/1991 | ................ 73/866.5 |
| JP | 9-14944 | * | 1/1997 | .......... G01M/19/00 |

OTHER PUBLICATIONS

TDB–Acc–No: NN81071260: *IBM Technical Disclosure Bulletin*, vol. 24, No. 2, p. 1260 "Spacing of Take Up Roll Width by the Supply Roll", Jul. 1981.*

Derwent–Acc–No: 1993–065803 Abstract of SU 1723488 A1 Alekhin Et Al "Fixing Device for Kinematic Movement Parameters Measuring Sensors—Has Flange on Body to Carry Disc with Sensors Unit While Binding Material Fills Free Space of Body", Mar. 1992.*

* cited by examiner

*Primary Examiner*—Thomas P. Noland
(74) *Attorney, Agent, or Firm*—E. Victor Indiano; Indiano, Vaughan & Roberts, P.A.

(57) ABSTRACT

An improved sensor and system of attaching sensors to their associated equipment, tooling or product. This attachment device provides stability of the sensor, quick removal and installation and a definite seating position thus providing a consistent reference point. The sensor holding system combines a flange on the sensor with a groove for the engagement of pre-loaded spring biased balls, and an outer housing that incorporates an opposing flange for seating the sensor and a ring of radially inwardly biased pre-loaded balls to engage the circumferential groove in the sensors. The diameter of the outer housing is determined by the sensor body but is kept as small as practical.

18 Claims, 5 Drawing Sheets

POSITION SENSOR AND HOUSING THEREFOR

This application claims the benefit of U.S. Provisional Application No. 60/096,323 filed Aug. 12, 1998.

I. FIELD OF THE INVENTION

The present invention relates to position sensors and more particularly to housings for position sensors for mounting the position sensor onto testing equipment or associated devices.

In one embodiment, a sensor with an outer flange is used in conjunction with an outer body (sensor housing) having an inner flange to provide a definite position for the sensor, which position is repeatable on the re-installation of the original sensor or the placement of a substitute sensor into the housing. In another embodiment, the housing includes pre-loaded sprung balls that are positioned and biased to push radially inwardly against a radially outwardly facing, circumferential groove formed on the sensor to provide a radially inwardly, and axially downwardly directed force on the sensor to assure good registry to the flanges of both the sensor and outer housing, thereby maintaining a repeatable position of the sensor.

II. BACKGROUND OF THE INVENTION

Sensors are often placed within equipment, tooling, gauge fixtures and the like to help determine the size and shape characteristics of a workpiece, such as an automotive component (e.g. an automobile windshield or other glass member that is placed on the tooling fixture or the like. Many of these sensors are linear displacement-type sensors having a tubular construction, or at least have a partially tubular design in that portion of the sensor (the distal end) that is nearer to the sensor tip. Traditionally these sensors have been attached to fixtures through clamping, set screw and ball detents. Clamping and set screw attachment mechanisms have significant problems when used with many of the mechanical and electronic sensors used in today's equipment and products, because such attachment mechanisms can exert sufficient force on the sensor to pinch or distort the sensor, thereby causing inaccurate readings or else making the movable member of the sensor inoperable due to seizure or unreliable due to increased frictional resistance to the movement of the movable member caused by the pending forces of the attachment means. Seizure of the sensor occurs when the clamping mechanism that holds the sensor exerts a force on the movable member of the sensor, thereby impeding or preventing the movement of the movable sensor member. Clamping also has the draw back of requiring a tool, such as a wrench or Allen key to remove the sensor from the housing.

Prior known ball detent mechanisms, although allowing quick removal of the sensor, have not provided a sufficiently sturdy grip on the sensor to assure that the sensor is maintained in a consistent and accurate location. Bolting the sensor in place provides a good attachment but provides for slow removal of the sensor for service or replacement. Few if any commercially available linear sensors are provided in a condition ready for attachment by use of a bolting means.

Within the automotive component fixture industry, the common practice is to clamp sensors into position by utilizing a circumferential clamping system, that functions similarly to a hose clamp. These circumferential clamping systems can have a strong holding force, but apply an inordinate amount of radially directed load on the sensor, thereby often distorting the housing, and thereby impeding the movement of the movable portion of the sensor, which results in decreasing the performance and/or life span of the sensor. Distortion of the housing can impair the sensor's performance by binding the movable plunger element of the sensor, or otherwise retarding its movement.

However, attempting to eliminate this binding force by reducing this clamping force creates its own problems. In particular, if the clamping force exerted on the sensor is reduced to a point that permits normal, non-bound or non-distorted operation of the sensor plunger, the sensor winds up being held too weakly by the clamp to be held in a stable, unmoving position thereby.

As can be deduced from this discussion, room exists for improving upon the prior art sensors. Specifically, a need exists for a sensor placement system: (1) that allows quick removal and replacement of the sensor for service; (2) that has the ability to hold the sensor firm and stable while operating; and (3) that is capable of achieving an accurate and repeatable positioning of the sensor when the sensor(s) in the fixture, tool or equipment are replaced. One object of the present invention is to provide such a device.

III. SUMMARY OF THE INVENTION

In accordance with the present invention, an attachment system is provided for a sensor system that permits a linear sensor to be removed and replaced quickly without the need for tools; secures the sensor firmly in a manner that eliminates movement between the housing and the sensor; and provides a system by which replacement sensors can be positioned accurately with repeatability.

Preferably, each of the sensor and the housing include a mating flange that creates a pair of mating surfaces for providing a consistent matching plane of engagement. The seating of the sensor flange on the housing flange allows for repeatability of the insertion depth of the sensor into the housing. The flange also helps achieve accuracy in the depth that the sensor is inserted into the housing. The flange further provides an area of contact in a plane perpendicular to the axis of insertion, thereby enhancing the stability and firmness with which the sensor is held in the housing. The mating flanges can be continuous, circumferential flanges or a segmented, circumferential flanges having sections removed to permit insertion of the sensor from the rear or front of the housing, while still holding the sensor securely in position when assembled. The mating surfaces of the mating flanges can also be tangential to the circumference of the face of the flange; or alternately, the mating surfaces can be perpendicular to the axis of the insertion or measuring axis.

Alternately, the attachment housing can use a holding system that consists of a clamp, set screw, ball detents, groove and clamp, bolts, or other common system of holding fast tubular structures within a tube. It is preferable that the holding system applies a load in an axial direction to pull or push the sensor into engagement with the flange. It is also preferable that the holding system does not apply or is incapable of applying radial loads on the sensor in excess of the sensor's capability to take such loads, thereby reducing the likelihood that the sensor housing and clamping mechanism will create distortions within the body of the sensor that degrade its performance.

Through this use, in the present invention of a combination of a flange and holding system, the housings can be designed to exert less force on the sensor as the combination of both the flange and clamp enhances the stability and the sensor within the housing without the need for the higher holding forces commonly used with known prior art devices.

The size of such mating flanges and therefore, the size of the housing is usually determined by the sensor size and type. However, it is preferable to keep the flange and clamping system as small as practical to allow the greatest flexibility of placement of the sensor.

The depth of the flange position within the receiving housing, and the relative axial position of the flange along the body of the sensor are toleranced such that when an existing sensor is removed, and the existing sensor replaced by the insertion of another sensor, the replacement sensor exhibits an insertion depth identical to the first (replaced) sensor. This continuity of insertion depths between sensors permits calibration and zero point referencing to be performed outside of the gauge or equipment where the sensor is being utilized, thus reducing the down time of the gauge or equipment during sensor change.

V. DESCRIPTION OF THE PREFERRED EMBODIMENT

The first embodiment of a sensor mechanism that includes a sensor 10 and a generally cylindrical sensor housing 12 is shown in FIGS. 1–3 and 9–11. The sensor housing 12 is designed for being inserted into an aperture of a test fixture 8 that is used in industrial processes, such as the manufacture of automotive glass, to test the manufactured item (e.g. the window glass) to ensure that the size and shape of the manufactured item fits within those tolerances specified by the purchaser of the manufactured item, e.g. the manufacturer of the automobile.

Figures 3, 4:
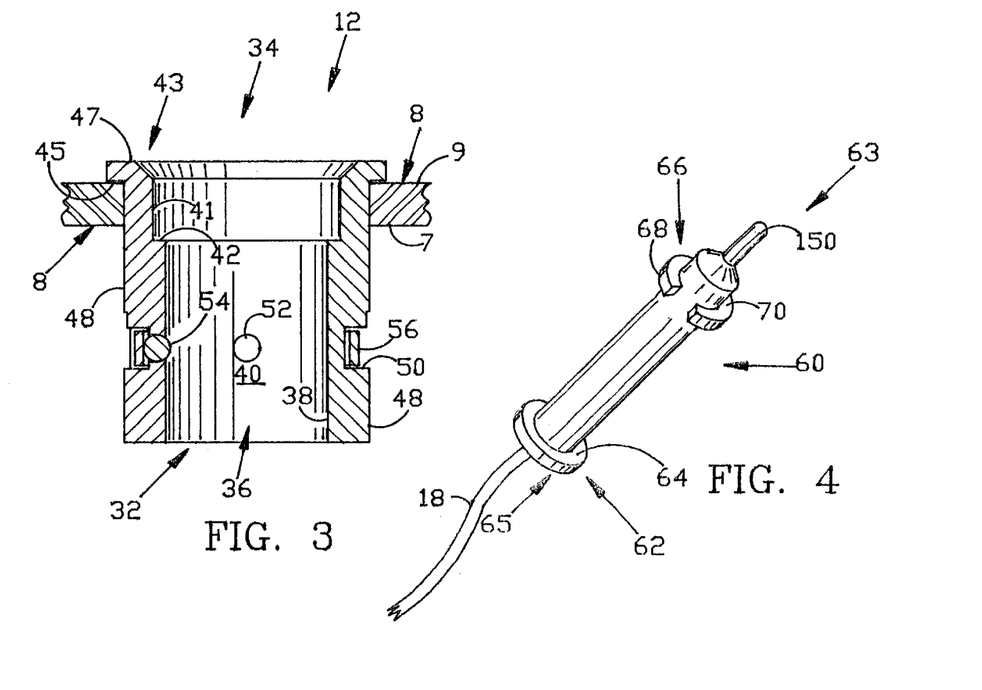
FIG. 3 is a sectional view taken along lines 3—3 of FIG. 2 of the receiving housing of FIG. 2 mounted in a test fixture.
FIG. 4 is a perspective view of an alternate (second) embodiment sensor with a discontinuous (segmented) flange.

The test fixture 8 usually comprises a platform having an upper side (outer) surface 9 that is shaped to correspond generally with one of the surfaces of the manufactured item. The test fixture 8 also includes a lower (inner) side surface 7 that defines a hollow interior of the fixture 8. The sensor housing 12 is inserted through an aperture in the fixture 8 and includes means to engage the upper side surface 9 of the fixture 8, to prevent the sensor housing 12 from passing entirely through the aperture in the fixture 8. The majority of the volume of the sensor housing 12 is disposed within the interior of the fixture 8. The sensor member 10 is removably attachable to the sensor housing 12, to permit the sensor 10 to be removed, when necessary, for servicing or replacement, as the sensor housing 12 will typically last throughout the life of the fixture 8, but the sensor element needs to be replaced periodically. Periodic replacement of the sensor is required as the sensor element 10 is a "wear-out" part that normally will not last, without servicing or replacement, throughout the useful life of the fixture 8.

Figures 1, 2:
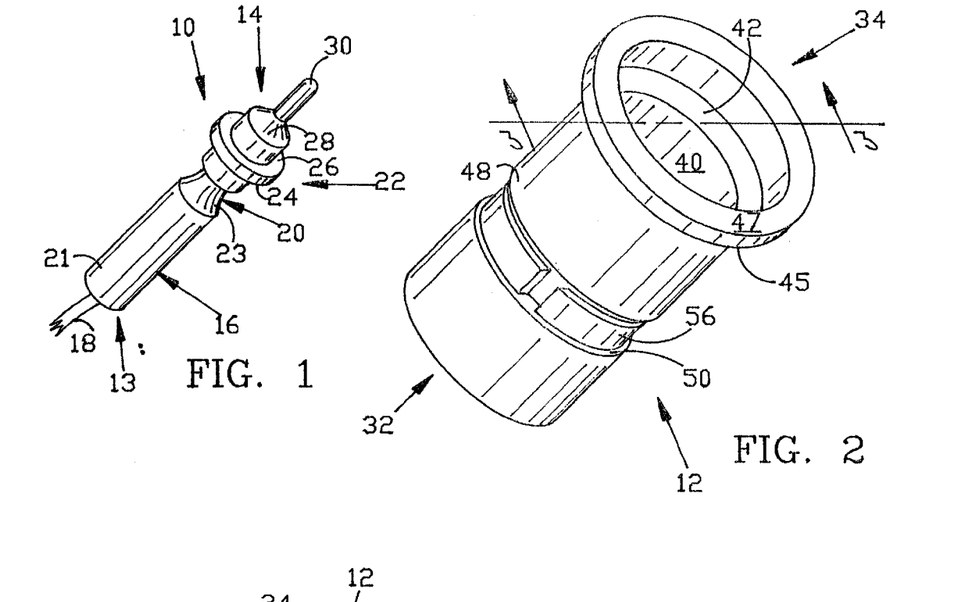
FIG. 1 is a perspective view of a first embodiment sensor with a continuous flange and a circumferential groove for receiving a ball or clamp.
FIG. 2 is a perspective view of a first embodiment receiving housing for receiving the first embodiment sensor.

The sensor element 10 includes a proximal end 13, and a distal end 14. When in use, the proximal end 13 resides below the lower surface 7 of fixture 8, and therefore, in the interior of the fixture 8; and the distal end 14 typically resides above the upper surface 8 of the fixture, to extend axially outwardly therefrom. The sensor element 10 includes a generally cylindrical body portion 16 having a signal wire 18 that extends from the proximal end 13 of the cylindrical body portion 16. The signal wire 18 may be integrally attached to the sensor element 10, or alternately, may be plugged into a male or female plug receptacle formed at the proximal end 13 of the cylindrical body portion 16.

The cylindrical body portion 16 includes a radially outwardly facing circumferential groove 20 formed on the outer surface 21 thereof. The circumferential groove 20 has a generally arcuate cross section. The circumferential groove 20 is formed approximately one-third of the way between the proximal and distal ends, 13 and 14 respectively, of the cylindrical ends of the body portion 16. As will be discussed in more detail below, the circumferential groove 20 is positioned to be disposed adjacent to the clamping means of the sensor housing 12 when the sensor element 10 is inserted into the sensor housing 12.

A radially extending, washer-shaped mating flange 22 is formed to extend radially outwardly from the cylindrical body portion 16, and is positioned relatively distally of the circumferential groove 20. The washer-shaped mating flange 22 is sized and positioned to mate with, and engage the sensor housing. The mating flange 22 includes a radially extending, axially proximally facing, generally planar mating surface 24, and a radially extending, axially distally facing, generally planar surface 26. Mating surface 24 is designed for mating against a surface of the sensor housing 12, for accurately and repeatably positioning the sensor element 10 within the sensor housing 12. The cylindrical body portion 16 includes a frusto-conical portion 28 at its distal end that provides a tapering surface for the distal end of the cylindrical body portion 16. Frusto-conical portion 28 terminates at its radially interior extreme at an axially extending aperture that is formed for receiving an axially extending, axially movable plunger member 30.

The sensor housing 12 includes a proximal end 32 and a distal end 34. The hollow interior 36 of the sensor housing 12 defines an axially extending passageway having an open proximal end and an open distal end. The interior wall 40 of the sensor housing 12 includes a relatively reduced diameter proximal portion 38, and a relatively enlarged diameter distal portion 41. The reduced diameter proximal portion 38 and enlarged diameter distal portion 41 are joined by a radially extending, axially distally facing shelf 42, that is sized and positioned for mating with the axially proximally facing mating surface 24 of the mating flange 22 of the sensor element 10.

The sensor housing 12 also includes a radially outwardly extending lip 43 that is formed at the distal end of the sensor housing 12. The lip 43 comprises the most distal point of, and the largest diameter portion of the sensor housing 12, and is provided for engaging with fixture 8, to prevent the sensor 12 from falling through the aperture in the fixture 8 into which the sensor housing 12 is inserted. The radially outwardly extending lip 43 includes an axially proximally facing, radially extending surface 45, that is sized and positioned for engaging the axially distally facing top surface 9 of the fixture 8. The radially outwardly extending lip 43 also includes an axially distally facing surface 47.

The sensor housing 12 further includes an axially extending, radially outwardly facing exterior wall 48 having a circumferential groove 50 formed therein. An array of radially extending apertures 52 extend through the wall of the sensor housing 12 for receiving an array of sensor element-engaging balls 54 that are radially movable within the apertures 52. A compressive hoop expander 56 is received within the circumferential groove 50 for urging the series of balls 54 radially inwardly against the radially outwardly facing wall of the sensor 10. The balls 54, aperture 52, circumferential groove 50 and hoop expander 56 combine to form a sensor retaining means for engaging the sensor element 10 when it is inserted in the housing 12, and to retain the sensor element 10 within its proper position within the housing 12.

Figure 9:
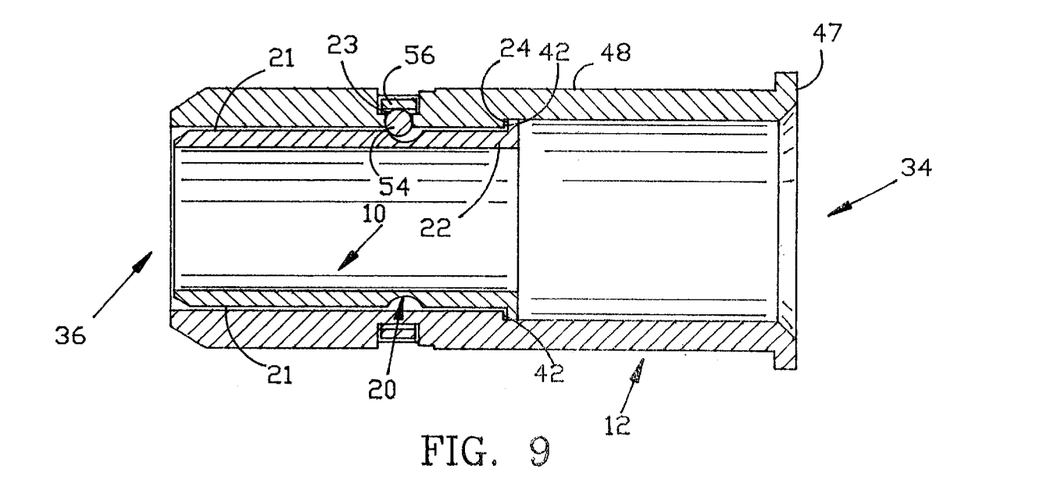
FIG. 9 is a sectional view, taken along lines 10—10 of FIG. 11, of the first embodiment sensor housing 12 shown in FIG. 2, illustrating the positioning of the axially proximal portion of the sensor 10 shown in FIG. 1 therein.

When the sensor 10 is inserted into the sensor housing 12, the circumferential groove 20 of the sensor element 10 is positioned at the same axial position as the circumferential groove 20, so that the series of balls 54 will engage the sensor element 10 in its circumferential groove 20. The series of balls 54 are designed to engage the circumferential groove 20 at a position other than the radially inward most position of the circumferential groove 20. Rather the sensor housing 12 and sensor element 10 are sized and positioned so that the sensor engaging balls 54 engage the circumferential groove 20 on a ramping surface 23 of the circumferential groove 20. The ramping surface 23 is that surface that is disposed relatively proximally, and generally radially outwardly of the radially inner most point of the circumferential groove 20.

Figure 10:
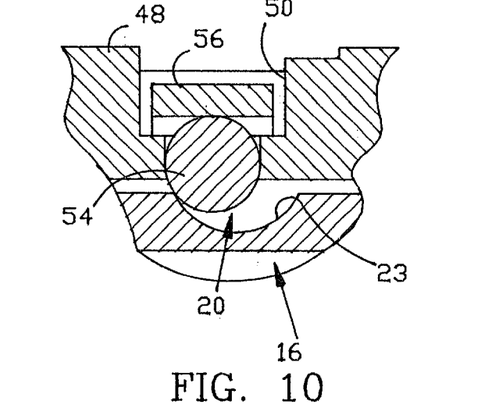
FIG. 10 is an enlarged sectional view of the spring clip 56 of the first embodiment sensor and housing of FIGS. 1–3, and 9.

By engaging the circumferential groove 20 on a ramping surface 23, (rather than at bottom dead center of the circumferential groove 20), the series of sensor engaging balls 54 exerts both a radially inwardly directed force against the sensor member 10 and an axially proximally directed force against the sensor element 10. This combination of the exertion of radially inwardly, and axially proximally directed forces helps to better maintain the axially proximally facing surface 24 of the sensor element 10 in engagement with the axially distally facing surface 42 of the shelf of the sensor housing 12, thus more accurately positioning the sensor 10 within the housing 12. The hoop expander member 56 exerts a radially inwardly directed, compressive force against the series of balls 54, to maintain the exertion of the radially inwardly and axially proximally directed force of the series of balls 54 on the sensor member 10.

The sensor 10 and sensor housing 12 of FIGS. 1 and 2 operate in the following manner. The proximal end 13 of sensor 10 is inserted into the distal end 34 of the housing 12. If signal wire 18 plugs into the proximal end 13 of the sensor, the signal wire 18 is unplugged before inserting the sensor 10 into the housing 12. Otherwise, the signal wire 18 has a plug on its proximal end (not shown), and is "hardwired" at its distal end to the sensor 10. In such case, the proximal end plug of wire 18 is unplugged from its connecting wire before the sensor 10 is inserted into the housing 12.

The sensor 10 is inserted axially into the housing until the axially, proximally facing mating surface 24 of the mating flange 22 engages the axially distally facing surface 42 of the housing 12. When the surfaces 24, 42 are placed against each other, the sensor 10 is properly positioned within the housing 12. Simultaneously, the series of balls 54 are urged radially inwardly by the expandable hoop 56, so that the balls 54 become seated in the circumferential groove 20. More particularly, the apertures 52 in which the balls 54 reside are positioned so that the balls 54 engage the relatively proximally disposed ramping portion 23 of the circumferential groove 20. As the balls 54 engage the ramping portion 23, they exert a radially inwardly, and axially proximally directed force on the sensor 10. This has the effect of urging the entire sensor 10 in a generally proximal direction, to thereby exert a continuous pressure in a proximal direction for keeping the mating surface 24 of the mating flange 22 of the sensor 10 in a force-induced mating relationship with the mating surface 42 of the housing 12. This radial and proximal exertion force by the balls 54 helps to thereby maintain the sensor 10 in its proper position relative to the sensor housing 12.

As will be appreciated, the position of the sensor housing 12 relative to the fixture 8 is fixed, through the engagement of the proximal facing surface 45 of the sensor housing 12 with the axially facing outer surface 9 of the fixture (or jig) 8. As such, the position of the sensor housing 12 is known and fixed. With the arrangement discussed above, the applicant better fixedly positions the sensor 10, in a known position. As such, when the sensor 10 needs to be replaced with another sensor unit (not shown), that replacement sensor unit should be positioned identically to the old sensor unit 10, so long as the new sensor unit (not shown) has the same size and shape as the old sensor unit.

Additionally, the radially inwardly, and axially proximally directed force exerted by the balls 54 and hoops expander 56 of the present invention enhances the stability of the sensor 10 in its engagement with the housing 12 as the mating surfaces 24, 42 are not only in contact, but are being forced together. Further, this system requires no external tools to insert or remove a sensor.

FIG. 9 is a sectional view (taken along lines 10—10 of FIG. 11) of the housing 12, receiving the sensor 10, (only the axially inner (or proximal) portion of which is shown), showing the engagement of one of the radially inwardly biased spring balls 54 of the housing 12 with the circumferential groove 20 of the sensor 10, and the engagement of the respective mating flanges 24, 42 of the respective sensor 10 and housing 12; the balls 54 being urged radially inwardly through the action of the circumferential spring clip type hoop expander 56.

FIG. 10 is an enlarged sectional view of the hoop expander 56 of FIG. 9 urging the engagement of the balls 54 on the ramping portion 23 of the circumferential groove 20 of the sensor 10.

Figure 11:
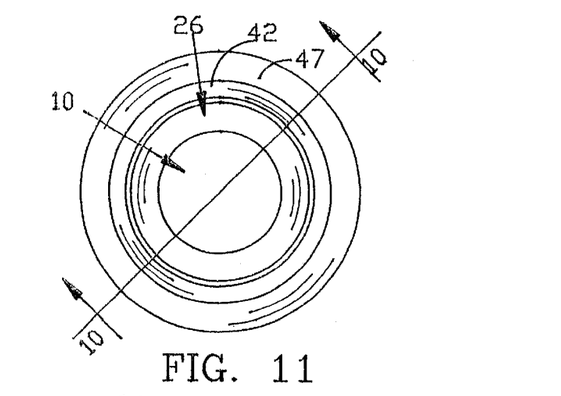
FIG. 11 is an end view of the first embodiment combination housing and sensor, shown also in FIGS. 1–3 and 9–10, showing the various concentric layers in phantom.
Figure 12:
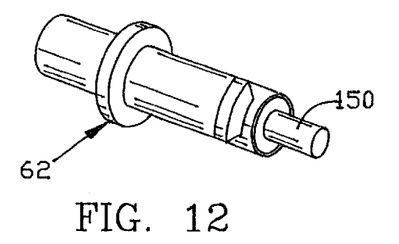
FIG. 12 is a perspective view of the second embodiment sensor 60 of FIG. 4.

FIG. 11 is an end view of the combination housing 12 and sensor 10, showing the various concentric layers including the lip 47, and flange upper surface 26 in phantom.

The second embodiment of the present invention is shown in FIGS. 4–6, and 12–18, with a variation of this second embodiment shown in FIGS. 19–22. The embodiment shown in FIGS. 4–6 and 12–18 includes a back-loading sensor 60 that loads from the underside or proximal end of sensor housing 61. This differs from the front-loading sensor 10 shown in FIGS. 1–3 and 9–11.

Sensor 60 includes a proximal end 63 and a distal end 65. Similar to the sensor 10 shown in FIG. 1, the proximal end 63 of sensor 60 includes a movable plunger element 150. Sensor housing 61 also includes a proximal end 67 and a distal end 69. When the sensor 60 is engaged to the sensor housing 61, the proximal end 63 of the sensor 60 disposed adjacent to the proximal end 67 of the sensor housing 61.

The sensor 60 of the second embodiment differs in physical characteristics from the sensor 10 of the first embodiment in three important respects. First, sensor 60 has no circumferential groove, such as circumferential groove 20. Second, sensor 60 includes a proximal, housing-engaging flange 62 that is not found in sensor 10 of the first embodiment. Third, sensor 60 includes a first and second 68, 70 arcuate flange segments located adjacent the distal end of the sensor 60.

Sensor 60 and receiving housing 61 each contain a discontinuous flange comprised of flange segments on both the sensor (see segments 68, 70 of FIG. 4) and receiving housing (see segments 86, 87). These discontinuous flanges 68, 70, 86, 87 allow for the insertion of the sensor 60 from the back or reverse end of the sensor housing 61. The insertion of the sensor 60 is accomplished by pushing the flange segments 68, 70 of the sensor 60 distally beyond the flanges 86, 87 of the receiving housing 61, compressing the wave spring (FIG. 6) or the coil spring (FIGS. 14 and 19) and then rotating the sensor 60 ninety degrees to align the flanges so that the axially proximal facing surface of the sensor's flanges 68, 70 mate with the axially distally facing surfaces of the flange segments, 86, 87 of the housing 61. The wave spring 93 or coil spring 193 provides a continuous axially directed force on the flanges of both the sensor 60 and housing 61, thereby assuring a good contact. This continuously exerted axial force that is exerted by the springs (93 or 193) to force the flanges 68, 70, 87, 88 together, enhances the stability of the sensor 60 in position, and works to reduce, or eliminate movement of the sensor 60 relative to the housing 61. This system also requires no tools to insert or remove a sensor.

Figure 13:
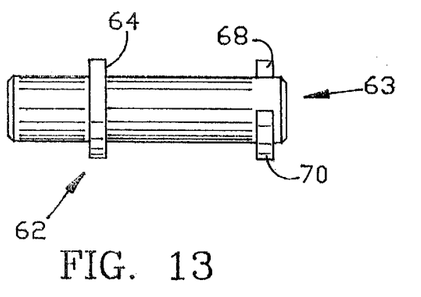
FIG. 13 is a side view of the second embodiment sensor 60 shown in FIG. 12.
Figures 14, 15, 16, 17:
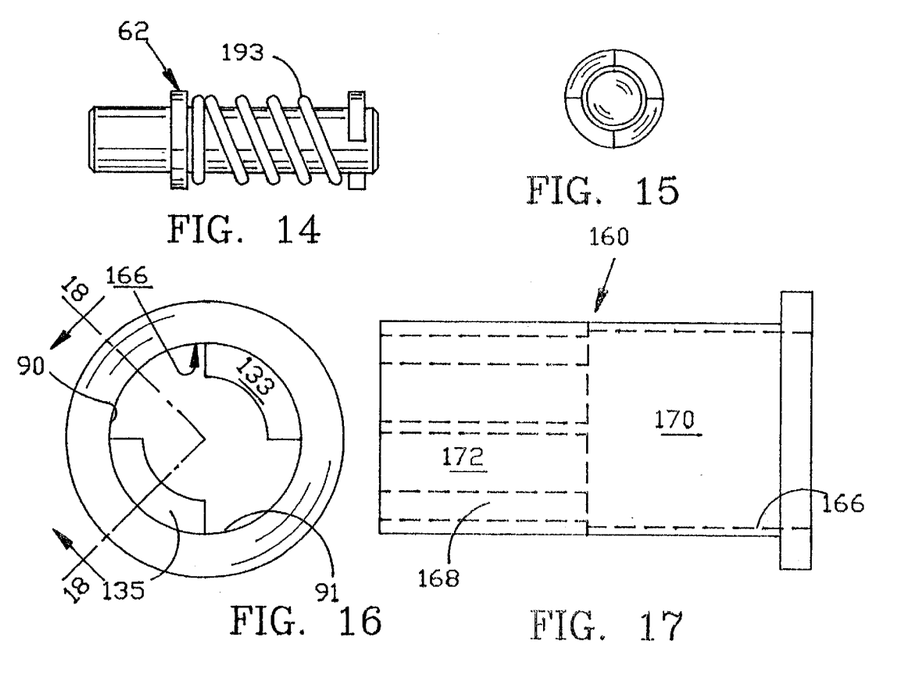
FIG. 14 is a side view of the second embodiment sensor 60, similar to that shown in FIG. 13, but rotated 90 degrees about a longitudinal axis from the position shown in FIG. 13.
FIG. 15 is an end view of the second embodiment sensor 60.
FIG. 16 is an end view of the second embodiment sensor housing 61 designed for use with the second embodiment sensor 60.
FIG. 17 is a side view of the second embodiment housing 61 showing the interior walls in phantom.

FIG. 4 is a perspective view of a sensor 60, showing the generally cylindrical body with a continuous, radially outwardly extending washer-shaped flange 62, that is positioned adjacent to the proximal end of the housing 61, and a discontinuous (segmented) radially extending flange 66 having a pair of flange segments 68, 70; the flange segments 68, 70 being matable with a discontinuous intermediately positioned flange segments 86, 87 that extend radially inwardly from an interior wall of the housing 61; and also showing an axially movable plunger 150 of the sensor 140. FIG. 13 shows a side view of the sensor 60; and FIG. 14 shows a side view of the sensor 60, similar to that of FIG. 13, but rotated 90° about a longitudinal axis from the position shown in FIG. 13. FIG. 15 shows an end view of sensor 60; and FIG. 16 shows an end view of a housing 61 designed for use with sensor 60, wherein the housing 61 has a discontinuous intermediate flange having a pair of flange segments 86, 87 that extend radially inwardly from the cylindrical interior wall 166 (FIG. 18) of the housing. The spaces 90, 91 (FIG. 5), between the flange segments 86, 87, are sized and positioned to permit the flange segments 68, 70 of the sensor 60 to be passed axially therethrough. This permits the sensor 60 to be loaded into the proximal end of the housing 61, while still allowing the flange segments 68, 70 of the sensor to be positioned axially distally of the flange segments 86, 87 so that the axially proximally facing surfaces of the flange segments mate with the axially distally facing surfaces 133, 135 (FIG. 16) of the housing's 61 flange segments 86, 87.

Figures 18, 19, 20, 21, 22, 23, 24:
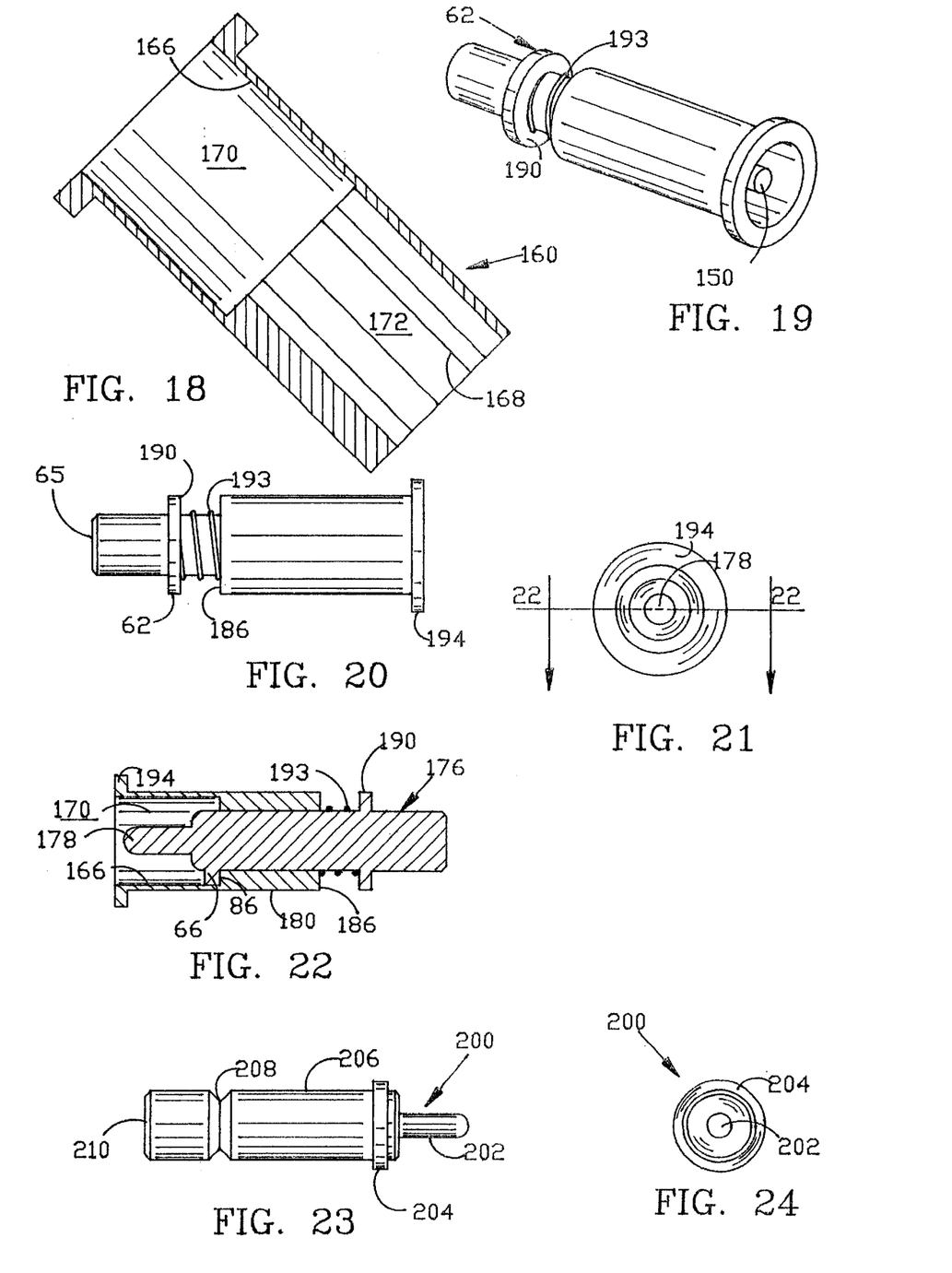
FIG. 18 is a sectional view taken along lines 18—18 of FIG. 16.
FIG. 19 is a perspective view of the second embodiment sensor 60; and housing 61.
FIG. 20 is a side view of the sensor 60 and housing 61.
FIG. 21 is an end view of the sensor 60 and housing 61.
FIG. 22 is a sectional view, taken along lines 22—22 of FIG. 21.
FIG. 23 is a side view of a fourth embodiment sensor 200.
FIG. 24 is an end view of the sensor 200 of FIG. 23.

FIG. 17 shows a side view of the housing showing the interior walls 166, 168 in phantom; interior wall 166 defining the relativity greater diameter front cavity 170, and interior wall 168 defining the relatively smaller diameter rear cavity 172. FIG. 18 shows a sectional view taken along lines 18—18 of FIG. 16.

FIG. 19 is a perspective view of a sensor illustrating the use of a coil spring 193 in place of wave spring 93. The coil spring 193 is placed between the axially proximally facing, radially extending surfaces of flange segments 86, 87 of the housing 61; and an axially distally facing, radially extending surface 190 of flange 62 which is formed near the proximal end 65 of the sensor 60.

FIG. 20 shows a side view of the sensor 60 and housing 61 shown in FIG. 19; and FIG. 21 shows an end view of the sensor 60 and housing 61 shown in FIG. 19.

FIG. 22 shows a sectional view, taken along lines 22—22 of FIG. 21 showing the engagement of a flange segment 66 of the sensor 60, with a flange segment 86 formed to extend radially inwardly from the cylindrical interior surface 166 of the forward cavity 170 of housing 61.

Figure 25:
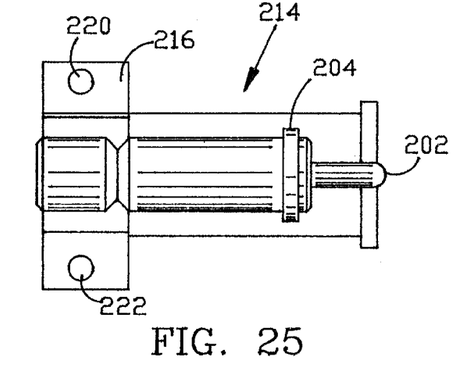
FIG. 25 is a side view of the fourth embodiment sensor 200, inserted into a fourth embodiment housing 214.
Figure 26:
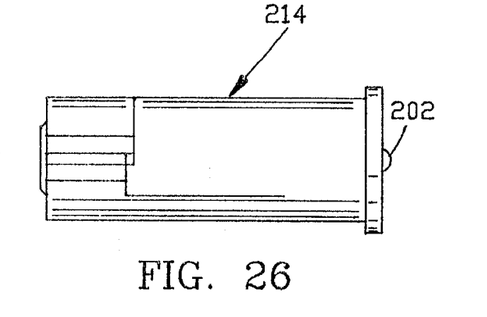
FIG. 26 is a side view of the fourth embodiment sensor 200 and housing 214, partly broken away, and generally similar to FIG. 25, but rotated 90° about a longitudinal axis.

FIG. 23 shows a side view of an alternate embodiment sensor 200 having an axially movable plunger 202, a forwardly disposed flange 204, a generally cylindrical body 206, and a V-shaped circumferential groove 208 formed near (but not at) the rear end 210 of the sensor 200; and FIG. 24 shows an end view of the sensor 200 of FIG. 23. As best shown in FIG. 25, sensor 200 is designed to be inserted into a housing 214 with a forward cavity 216 for receiving flange 204 of the sensor 200. A two-piece C-clamp 216 is disposed at the rear end of the housing 214. The C-clamp 216 includes apertures 220, 222 through which a first and second bolt (not shown) can pass for securing together the two pieces of the two-piece C-clamp 216. FIG. 26 shows a side view similar to FIG. 25, but rotated 90° about a longitudinal axis.

Figure 27:
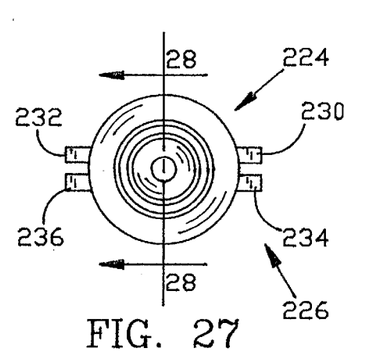
FIG. 27 is an end view of the fourth embodiment sensor 200 and housing 214.
Figure 28:
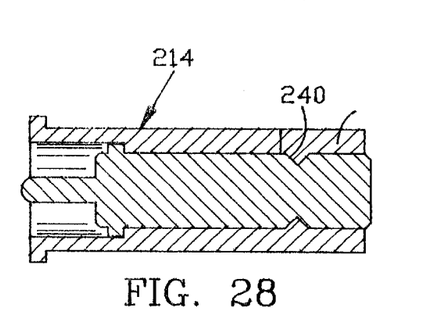
FIG. 28 is a sectional view, taken along lines 28—28 of FIG. 27.

FIG. 27 best illustrates an end view showing the first 224 and second 226 pieces of the two piece C-clamp. Each of the first and second pieces includes a pair of opposed flange portions 230, 232, 234, 236, through which the bolts can extend. FIG. 28 is a sectional view showing that at least one of C-clamp pieces 226 includes an arcuate, radially inwardly extending ridge 240 for engaging the V-shaped groove of the sensor 200 for maintaining the desired axial position of the sensor 200 within the housing 214.

Figure 29:
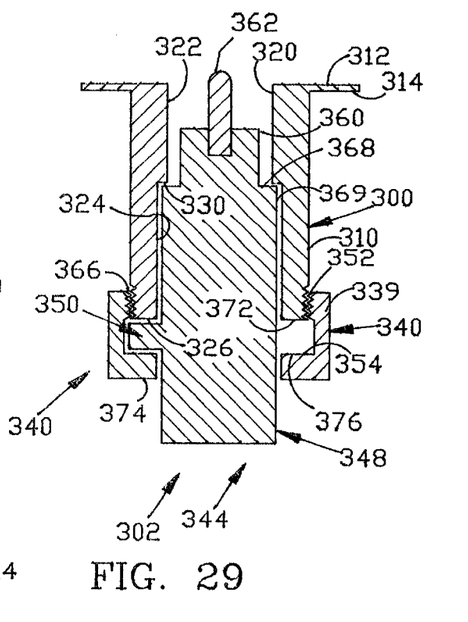
FIG. 29 is a sectional view of a fifth embodiment housing 300 and sensor 302 that is designed to permit the sensor 302 to be loaded into the interior side of the housing 300, and hence the fixture.
Figure 30:
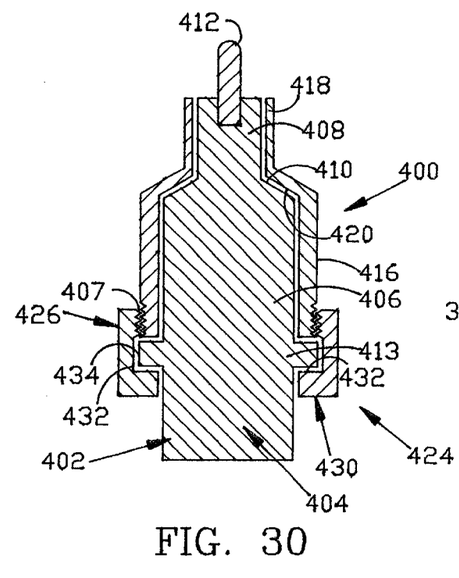
FIG. 30 is a sectional view of a sixth embodiment clamp 400 and sensor 402.

Referring now to FIGS. 29–30, there is shown a fifth embodiment clamp-type housing 300 and sensor 302 that is designed to permit the sensor 302 to be loaded into the interior end of the housing 300. The housing 300 has a generally cylindrical body 310, having a radially extending flange 312 disposed at its axially distal end. The underside surface 314 of the flange 312 rests on the upper surface (not shown) of the fixture. The cylindrical interior wall 320 of the clamp has a relatively smaller diameter portion 322, adjacent the distal end of the housing 300 near the radial flange 312. The cylindrical interior wall 320 also has a relatively larger diameter portion 324 adjacent to the proximal end 326 of the housing 300.

A radially extending, circumferential shoulder 330 connects the smaller diameter portion 322 to the larger diameter portion 324. Male threads 336 are formed on the axially proximal end of the radially facing outer surface of the clamp 300 for receiving the female threads 339 of a retaining ring 340.

The sensor 302 has a generally cylindrical body 344 with a generally cylindrical radially outer surface, that includes a relatively larger diameter portion 348 that includes a radially extending circumferential ring 350 formed thereon. Ring 350 includes an axially distally facing surface 352 and an axially proximally facing surface 354. The body 344 also includes a relatively reduced diameter portion 360, that has an axially distally facing upper end containing an axially movable plunger member 362, that is coupled to the electronics package (not shown) in the interior of the sensor 302 body 344.

The reduced diameter portion 360 is connected to the enlarged diameter portion 348 by a radially extending shoulder 368 which is sized and positioned to engage the radially extending shoulder 330 of the housing 300. The engagement of the shoulder 368 of the sensor 302 with the shoulder 330 of the housing prevents axially distal movement of the sensor 302. Additionally, the engagement of the axially distally facing surface 352 of the circumferential ring 350 with the axially proximally facing annular surface 372 of the clamp provides a stop to limit axially distal movement of the sensor 302, and properly axially positions the sensor 302 in the housing when the retaining ring 340 is threadedly engaged to the housing 300.

The retaining ring 340 has a radially extending lower flange portion 374, the axially distally facing surface 376 of which is sized and positioned to engage the axially proximally facing surface 354 of circumferential ring 350, to thereby urge ring 350 (and hence sensor 302) in an axially distal direction, to thereby properly position sensor 302.

FIG. 30 shows a clamp 400 and sensor 402 which are generally similar to the clamp 300 and sensor 302 shown in FIG. 29, except that the shoulder arrangement 410, 420 of clamp 400 and sensor 402 differs from the shoulder 368, 330 arrangement of the embodiment shown in FIG. 29.

Sensor 402 of FIG. 30 includes a generally cylindrical body 404 having an enlarged diameter portion 406, having a male threaded proximal end 407 on its radially distally facing surface. The body 404 also includes a reduced diameter relatively axially distally disposed reduced diameter portion 408. A frusto-conical shoulder 410 connects the outer surfaces of the enlarged diameter portion 406 and reduced diameter portion 408. An axially movable plunger 412 is disposed at the axially distal end of the sensor 402, and operates, and functions in a manner generally similar to the plunger 362 of the embodiment shown in FIG. 29. The sensor 402 also includes a radially extending ring 413 that is disposed generally axially inwardly of the axially inward end of the clamp 400.

The clamp 400 further includes a relatively axially disposed enlarged diameter portion 416; a relatively axially proximally disposed reduced diameter portion 418; and a frusto-conical shoulder 420 for connecting the reduced diameter portion 418 and enlarged diameter portion 416. The respective diameters of the reduced diameter portion 418, enlarged diameter portion 416, and frusto-conical shoulder 420 of the clamp 400 are slightly larger than the respective reduced diameter portion 408, enlarged diameter portion 406, and frusto-conical shoulder 410 of the sensor 402, to permit the sensor 402 to be slidably received by the clamp 400. Preferably, the angle of the frusto-conical shoulder 410 of the sensor is identical to the angle of the frusto-conical shoulder 420 of the clamp.

A retaining ring 424 is provided for retaining the sensor 402 in its engagement with the clamp 400. The retaining ring 424 includes an axially extending portion 426 having female threads at it axially distal end for receiving the male threads 407 formed on the radially outwardly facing surface, at the axially proximal end of the clamp 400.

The retaining ring 424 also includes a radially inwardly extending flange 430 having an axially distally facing surface 432 for engaging the axially inwardly facing surface 434 of circumferential ring 413 of the sensor 402. By tightening the threaded engagement between the retaining ring 424 and the clamp 400, the radially extending flange 430, through its engagement with the axially inwardly facing surface 434 of circumferential ring 413, moves the sensor 402 in an axially distal direction, to cause the shoulder 410 of the sensor to engage the frusto-conical shoulder 420 of the clamp 400, thereby properly positioning the sensor 402 within the clamp 400.

Figures 5, 6, 7, 8:
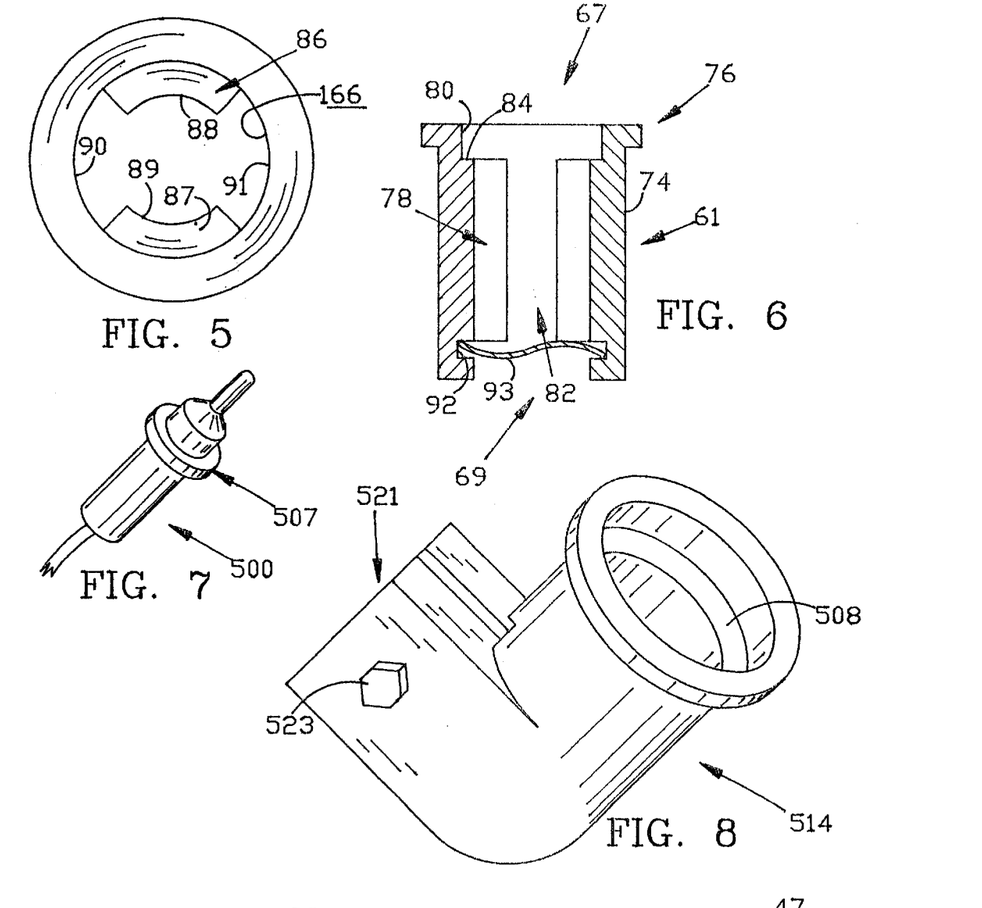
FIG. 5 is a top view of a second embodiment receiving housing designed for receiving the second embodiment sensor of FIG. 4.
FIG. 6 is a sectional view showing the receiving housing of FIG. 5.
FIG. 7 is a perspective view of an alternate (third) embodiment sensor having continuous mating flange.
FIG. 8 is a perspective view of a third embodiment receiving housing designed especially for use with the third embodiment sensor of FIG. 7.

Referring finally to FIGS. 7 and 8, a sensor 500 and an L-shaped receiving housing 514 is shown. Both the sensor 500 and receiving housing 514 having a continuous flange 507, 508. The receiving housing has a radially split clamping mechanism 521 actuated by a bolt 523. When the sensor is placed within the housing 514, the flanges 507, 508 mate providing an accurate depth location and continuity of insertion depth of sensor 500. The bolt-containing clamp 521 provides a holding force to keep the sensor 500 in position. However, this is not the preferred method because the clamp does not provide an axial load that imparts a continuous axially directed force that holds the flanges 507, 508 together.

I claim:

1. A sensor positioning apparatus to position a linear displacement sensor at
   a repeatable insertion depth in a test fixture capable of receiving a workpiece thereon,
   the apparatus comprising:
      a housing coupled to the test fixture, the housing including a housing body portion and a housing flange portion, the housing flange portion having a housing flange surface;
      a linear displacement sensor having a sensor body portion and a sensor flange portion, the sensor flange portion having a sensor flange surface;
      wherein the sensor is positioned such that the housing flange surface is in contact with the sensor flange surface; and
      wherein the location of the housing and sensor flange portions define the insertion depth of the sensor in the test fixture.

2. The sensor positioning apparatus of claim 1, wherein the housing further includes a clamping member for holding the sensor flange surface adjacent to the housing flange surface.

3. The sensor positioning apparatus of claim 2, wherein:
   the sensor body portion includes at least one groove having a ramping surface;
   the housing further includes a radially inwardly facing surface defining an interior cavity in the housing body portion, the interior cavity having at least one clamping member receiving cavity;
   the clamping member includes at least one sensor engaging ball disposed between the at least one clamping member receiving cavity of the housing and the ramping surface of the sensor and a restraining member; and
   the restraining member exerts a radially inwardly directed force on the at least one sensor engaging ball and the at least one ball in turn exerts an axially directed force on the ramping surface of the sensor for urging the sensor flange surface adjacent the housing flange surface to prevent relative movement between the sensor and housing.

4. The sensor positioning apparatus of claim 2, wherein
   the clamping member includes at least two clamping portions and at least one fastening member moveably coupled to the at least two clamping portions to adjust the separation between the two clamping portions; and
   the at least two clamping portions exert a force on the sensor body portion.

5. The sensor positioning apparatus of claim 4, wherein
   the sensor body portion includes at least one groove;
   the at least two clamping members each include a ridge; and
   the at least two ridges are disposed within the at least one groove of the sensor body portion to retain the position of the sensor flange surface relative to the housing flange surface.

6. The sensor positioning apparatus of claim 1, wherein the apparatus further includes a clamping member coupled to the sensor and the housing to hold the sensor flange surface adjacent to the housing flange surface.

7. The sensor positioning apparatus of claim 6, wherein the housing flange portion is continuous and wherein the sensor flange portion is continuous.

8. The sensor positioning apparatus of claim 7, wherein the clamping member is a spring.

9. The sensor positioning apparatus of claim 6, wherein the housing flange portion is discontinuous and comprises of at least one housing flange element and at least one housing flange space and wherein the sensor flange portion is discontinuous and comprises of at least one sensor flange element and at least one sensor flange space.

10. The sensor positioning apparatus of claim 9, wherein the clamping member is a spring.

11. The sensor positioning apparatus of claim 6, wherein the clamping member is a ring including a radially inwardly facing threaded surface and an, axially facing surface positioned adjacent to the sensor flange to retain the position of the sensor flange surface relative to the housing flange surface and wherein the housing body further includes a radially outwardly facing threaded surface to receive the threaded surface of the clamping member.

12. The sensor positioning apparatus of claim 1, wherein:
    the housing body portion has at least one clamping member receiving portion;
    the sensor flange surface is positioned adjacent to the housing flange surface and the sensor body portion has a recess portion containing a ramping surface;
    further comprising a clamping member including at least one ball member disposed between the clamping member receiving portion of the housing and the ramping surface of the sensor and a restraining member disposed to maintain the at least one ball member adjacent to the ramping surface.

13. The sensor positioning apparatus of claim 12, wherein the restraining member exerts a first load on the at least one ball member which in turn exerts a second axially directed load on the ramping surface of the sensor, to retain the position of the sensor flange surface adjacent to the housing flange surface.

14. A sensor positioning apparatus to position a linear displacement sensor at a repeatable insertion depth in a test fixture, the apparatus comprising:
    a linear displacement sensor including a generally cylindrical sensor body and a sensor flange;
    a housing capable of being coupled to a test fixture, the housing including a housing flange; and
    wherein the cylindrical sensor body is inserted into the housing such that the sensor flange and housing flange mate, the location of the housing and sensor flanges defining the insertion depth of the sensor in the test fixture.

15. The sensor positioning apparatus of claim 14, wherein the generally cylindrical sensor body includes a groove and the apparatus further includes a clamping member which couples with the groove in the sensor body to retain the sensor flange against the housing flange.

16. The sensor positioning apparatus of claim 14, wherein the sensor flange is discontinuous and includes at least one sensor flange element and at least one sensor flange space and the housing flange is discontinuous and includes at least one housing flange element and at least one housing flange space.

17. The sensor positioning apparatus of claim 16, wherein the apparatus further comprises a load inducing clamping member positioned to create a load to continually force the sensor and housing flanges together.

18. The sensor positioning apparatus of claim 14, wherein the position of the sensor flange and the housing flange are toleranced such that the sensor resides at a defined and accurate depth within the housing.

* * * * *